(12) United States Patent
Lockwood et al.

(10) Patent No.: US 8,727,312 B2
(45) Date of Patent: May 20, 2014

(54) BUTTERFLY VALVE

(75) Inventors: William T. Lockwood, Windsor Locks, CT (US); Scott W. Simpson, Easthampton, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 366 days.

(21) Appl. No.: 13/091,709

(22) Filed: Apr. 21, 2011

(65) Prior Publication Data

US 2012/0267557 A1    Oct. 25, 2012

(51) Int. Cl.
*F16K 1/22*    (2006.01)
*F02D 9/08*    (2006.01)

(52) U.S. Cl.
USPC .......................................... 251/306; 123/337

(58) Field of Classification Search
USPC ............................ 123/337; 251/305, 306, 308
See application file for complete search history.

(56) References Cited

U.S. PATENT DOCUMENTS

| | | | | |
|---|---|---|---|---|
| 1,860,619 | A | * | 5/1932 | Pfau .............................. 251/175 |
| 3,409,269 | A | * | 11/1968 | Fawkes ......................... 251/175 |
| 3,442,488 | A | * | 5/1969 | Adams ........................... 251/305 |
| 3,532,321 | A | * | 10/1970 | Bowman et al. .............. 251/175 |
| 4,021,215 | A | | 5/1977 | Rosenbush et al. |
| 4,063,709 | A | * | 12/1977 | Lorthiois ........................ 251/173 |
| 4,154,426 | A | * | 5/1979 | Santy et al. .................... 251/175 |
| 4,316,597 | A | | 2/1982 | Goodman et al. |
| 4,345,739 | A | | 8/1982 | Wheatley |
| 4,374,469 | A | | 2/1983 | Rannenberg |
| 4,396,199 | A | * | 8/1983 | Boyd et al. .................... 277/637 |
| 4,430,867 | A | | 2/1984 | Warner |
| 4,507,050 | A | | 3/1985 | Jeffery et al. |
| RE32,100 | E | | 4/1986 | Rannenberg |
| 4,632,360 | A | * | 12/1986 | DeSalve ........................ 251/175 |
| 4,817,387 | A | | 4/1989 | Lashbrook |
| 4,899,984 | A | * | 2/1990 | Strickler et al. .............. 251/306 |
| 4,944,489 | A | * | 7/1990 | Adams et al. ................. 251/306 |
| 5,072,781 | A | | 12/1991 | Goodman |
| 5,135,161 | A | | 8/1992 | Goodman |
| 5,315,817 | A | | 5/1994 | Vannini et al. |
| 5,347,828 | A | | 9/1994 | Kesten |

(Continued)

FOREIGN PATENT DOCUMENTS

| | | |
|---|---|---|
| DE | 2535006 | 2/1977 |
| DE | 3024589 | 1/1982 |
| EP | 2163796 | 3/2010 |

OTHER PUBLICATIONS

European Search Report mailed Jun. 15, 2012 for European Application Serial No. 12165216.8-2422. Date of Completion Jun. 6, 2012 All references cited incorporated herein.

*Primary Examiner* — John K Fristoe, Jr.
*Assistant Examiner* — Michael R Reid
(74) *Attorney, Agent, or Firm* — Cantor Colburn LLP

(57) ABSTRACT

A butterfly valve having a valve body is provided. The butterfly valve includes a valve disk assembly rotationally coupled to the valve body. The valve disk assembly has a disk member with a first surface disposed about a periphery having a first diameter and a second surface offset from the first surface. A seal ring is arranged adjacent the first surface, the seal ring having a first outer surface with a second diameter, wherein the second diameter is larger than the first diameter. A retainer is coupled to the second surface adjacent the seal ring opposite the first surface. The retainer has inner surface arranged to radially constraining the seal ring on the disk member.

15 Claims, 5 Drawing Sheets

(56) References Cited

U.S. PATENT DOCUMENTS

| | | |
|---|---|---|
| 5,664,760 A | 9/1997 | Army, Jr. et al. |
| 5,743,512 A | 4/1998 | Greenberg |
| 5,784,884 A | 7/1998 | Poerio et al. |
| 6,487,491 B1 | 11/2002 | Karpman et al. |
| 7,137,255 B2 | 11/2006 | Schmotolocha et al. |
| 7,168,236 B2 | 1/2007 | Schmotolocha et al. |
| 7,584,782 B1 | 9/2009 | Bizzarro |
| 7,740,228 B2 | 6/2010 | Simpson et al. |
| 7,871,240 B2 | 1/2011 | Zawilinski et al. |
| 2007/0194265 A1* | 8/2007 | Shenk ............ 251/305 |
| 2010/0301249 A1* | 12/2010 | Kolb et al. ............ 251/306 |

* cited by examiner

BUTTERFLY VALVE

BACKGROUND OF THE INVENTION

The subject matter disclosed herein relates to a valve and in particular to a butterfly valve having a retainer for a ring seal.

Butterfly valves are used in a wide variety of applications to control the flow of fluids. A butterfly valve typically has a disk member arranged in the flow of the fluid. The disk rotates between an open position where fluid flows and a closed position against a valve seat where fluid flow is stopped. A seal member is arranged about an outer periphery of the disk that engages the valve seat to prevent the flow of fluid when the valve is in a closed position.

In some high temperature applications, such as in aircraft for example, butterfly valves have historically performed poorly with reliability issues of slow or inaccurate operation that in some circumstances may result in the jamming of the valve or breaking of the seal ring. These issues are heightened in larger butterfly valves, such as those that are 3 inches (7.62 centimeters) or larger. The causes of these reliability issues may be attributed to several factors. Due to the high temperature environment, the seal ring is typically made from metals that have no natural lubricity and traditional plating processes, such as hard chrome plating for example, may no longer be used due to environmental concerns. Other secondary lubrication materials such as dry film lubricants for example have short effective lives.

Another factor that may lead to a reliability issue is the means by which the seal ring is retained in the disk. Some configurations allow the seal ring to rotate freely to alleviate friction issues, but include latching features to prevent excessive radial movement. These latch features significantly weaken the seal ring. Other configurations have non-rotating seal rings that increase friction issues. Still other configurations allow for the use of carbon material for the seal ring, but utilize complicated and heavy multi-piece disk designs.

Accordingly, while existing butterfly valves are suitable for their intended purposes the need for improvement remains, particularly in a butterfly valve having a disk with a freely rotating seal ring.

BRIEF DESCRIPTION OF THE INVENTION

According to one aspect of the invention, a butterfly valve disk assembly is provided. The valve disk assembly having a disk member rotationally coupled to a valve body of a butterfly valve, the disk member having a first surface disposed about a periphery having a first diameter, the disk member having a second surface offset from the first surface. A seal ring is arranged adjacent the first surface, the seal ring having a first outer surface with a second diameter, wherein the second diameter is larger than the first diameter. A retainer is coupled to the second surface adjacent the seal ring opposite the first surface, the retainer having an inner surface, wherein the inner surface is arranged to radially constrain the seal ring on the disk member.

According to another aspect of the invention, a butterfly valve is provided. The butterfly valve having a valve body with a bore. A valve disk assembly is rotationally coupled to the valve body, the valve disk assembly rotatable between a closed position in contact with the bore and an open position, the valve disk assembly having a disk member with an inlet side and an outlet side, the inlet side having a first surface disposed about a periphery and a second surface offset from the first surface opposite the outlet side. A semi-circular seal ring is arranged adjacent the first surface. A retainer is coupled to the second surface, the retainer arranged to retain the seal ring in a radial and axial direction.

According to yet another aspect of the invention, another butterfly valve is provided. The butterfly valve having a valve body. A valve disk assembly is rotationally coupled to the valve body, the valve disk assembly comprising a disk member having a side with a first surface, a second surface offset from the first surface and a third surface offset from the second surface and distal from the first surface, the disk member having a groove disposed between the first surface and the third surface. A seal ring is arranged adjacent the third surface and at least partially within the groove, the seal ring having an outer diameter larger than a disk outer diameter. A retainer having an L-shaped portion is arranged adjacent the seal ring, the retainer having a first portion and a second portion spaced apart by a gap, the first portion being disposed adjacent a first end of the L-shaped portion and the second portion adjacent a second end of the L-shaped portion, the first portion and the second portion being coupled to the second surface.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
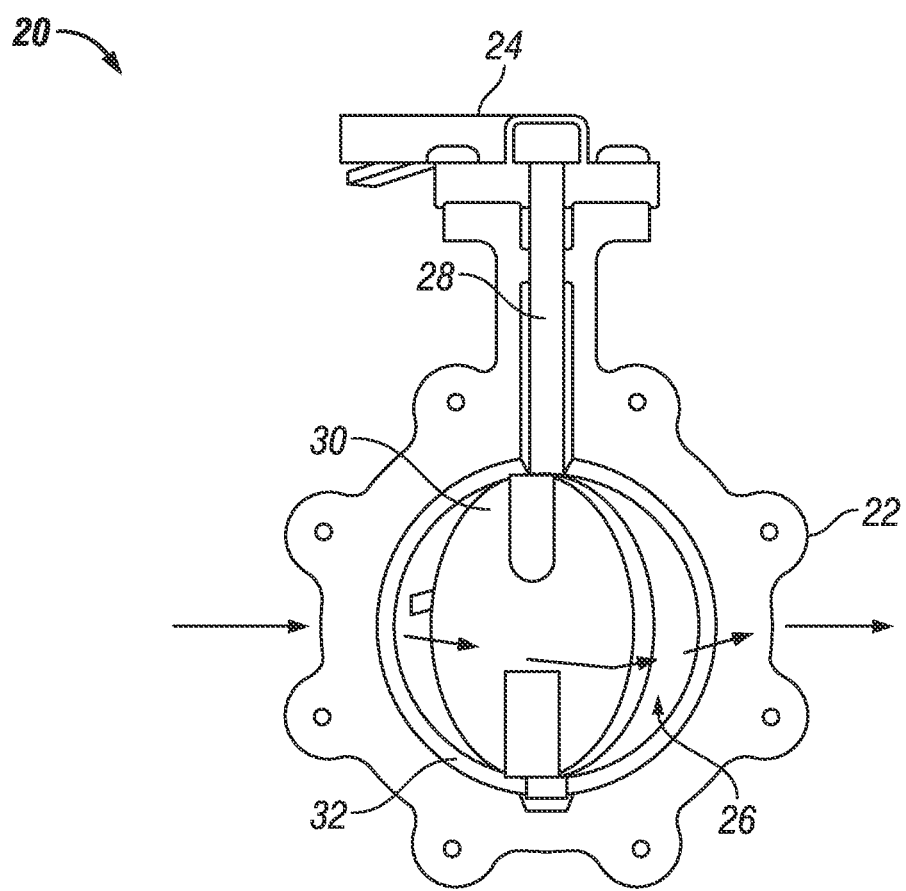
FIG. 1 is a side view partially in section of a butterfly valve in accordance with an embodiment of the invention.
Figure 2:
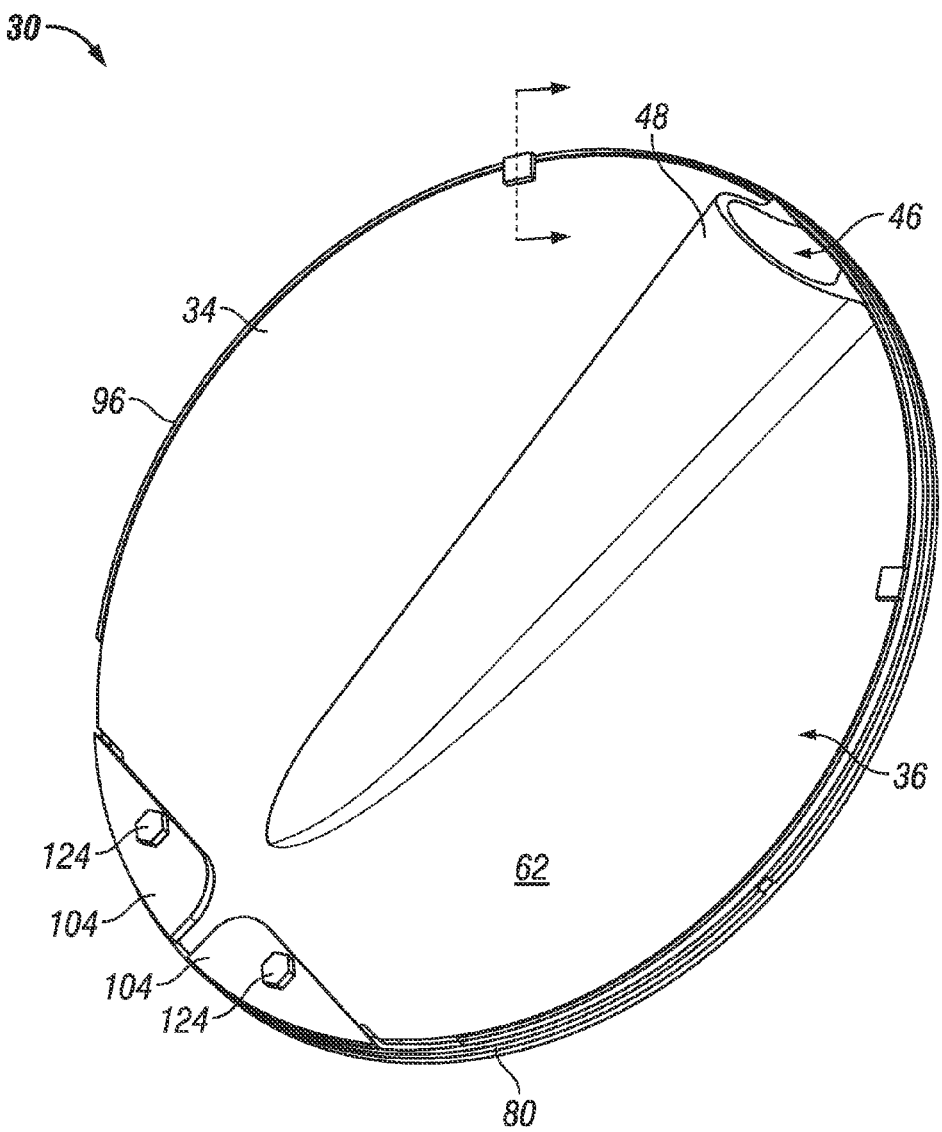
FIG. 2 is a first perspective view of a valve disk assembly for use with the butterfly valve of FIG. 1.
Figure 3:
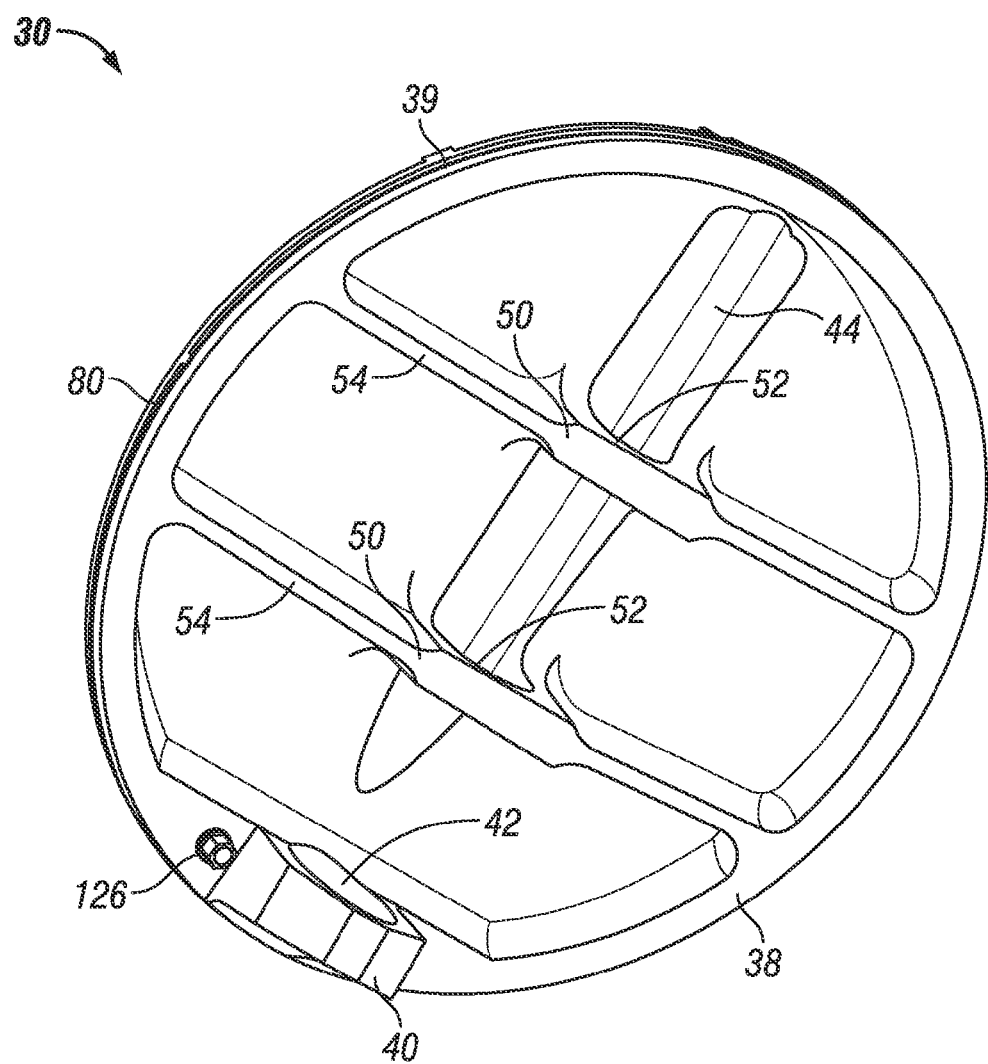
FIG. 3 is a second perspective view of the valve disk assembly of FIG. 2.
Figure 4:
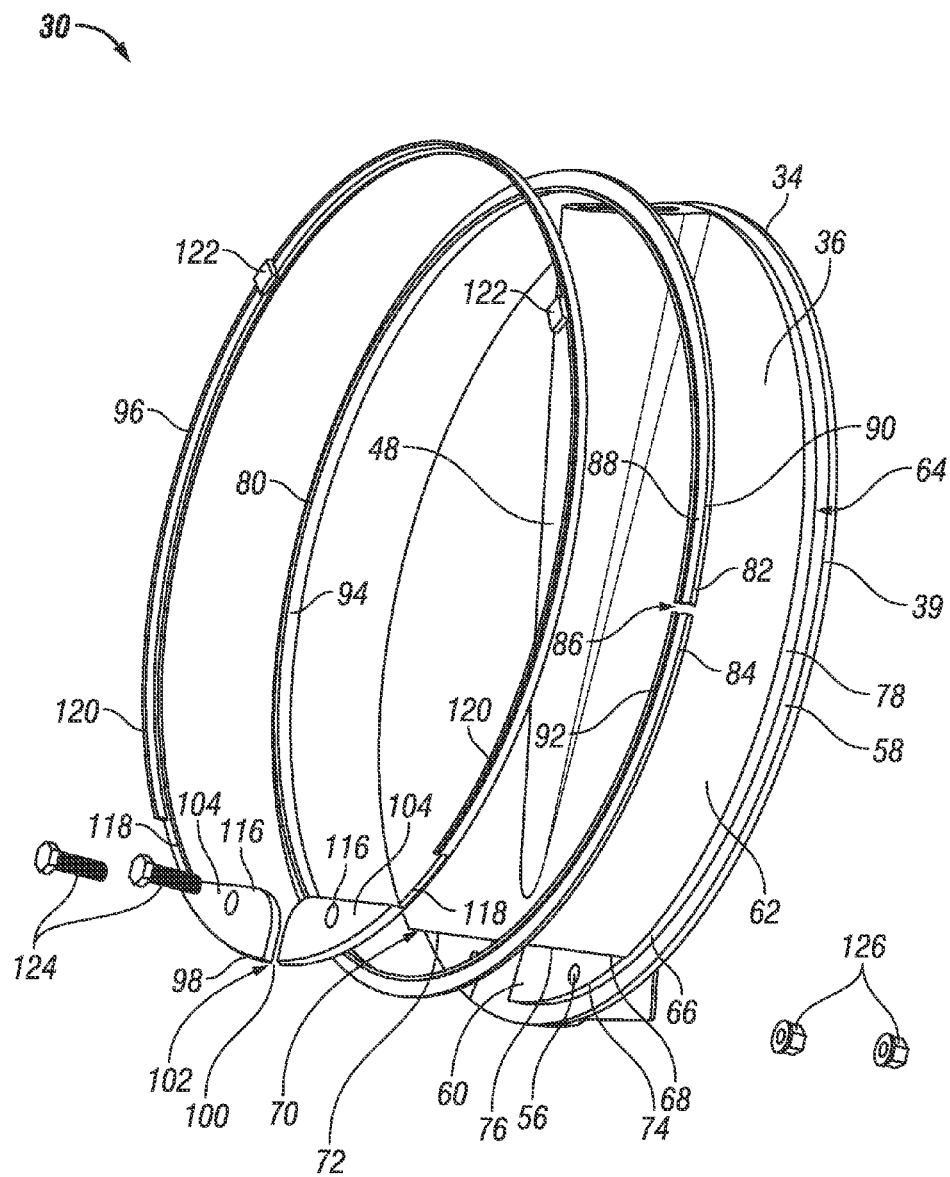
FIG. 4 is an exploded view of the valve disk assembly of FIG. 2.
Figure 5:
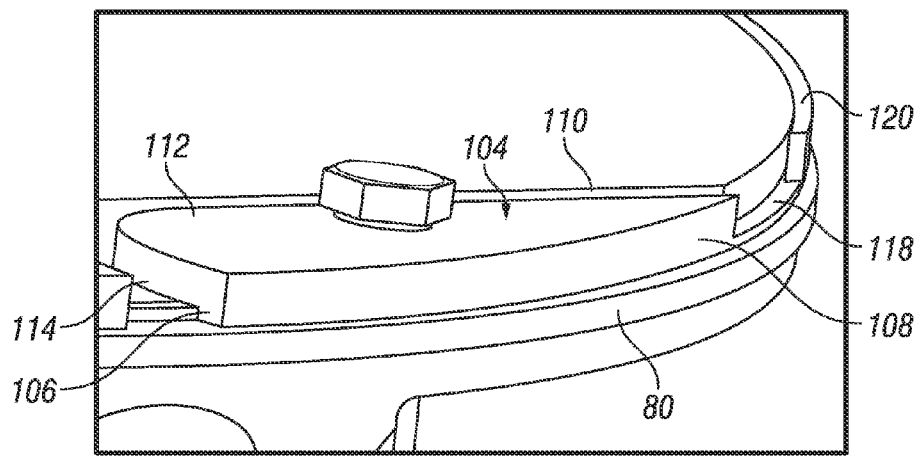
FIG. 5 is an enlarged perspective view of a portion of the valve disk assembly of FIG. 2; and, FIG. 6 is a partial sectional view of the valve disk assembly of FIG. 2.
Figure 6:
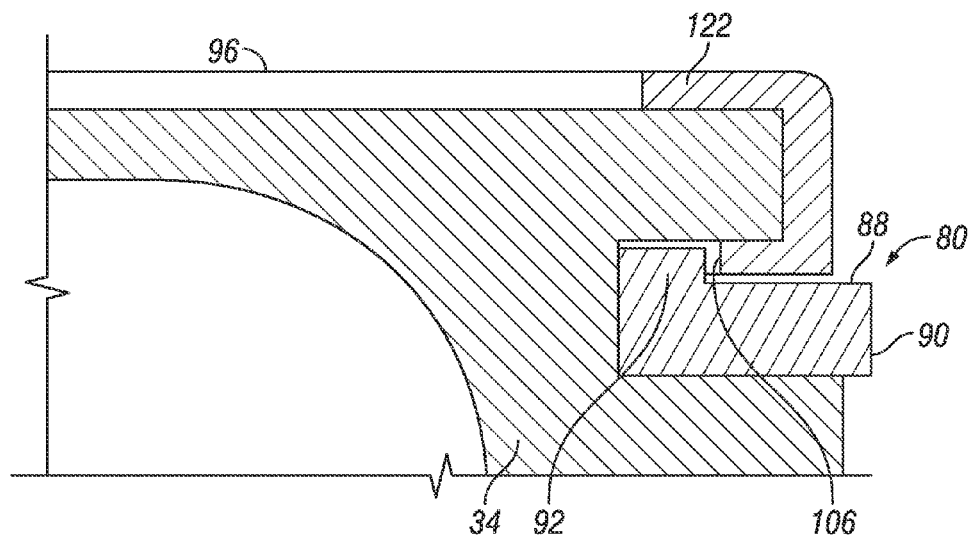

Butterfly valves are used in a variety of applications to control the flow of a fluid. An exemplary butterfly valve 20 is shown in FIG. 1 having a valve body 22 and a control device 24. The valve body 22 includes an interior passage 26 through which the fluid flows. The control device 24 is connected via a shaft 28 to a valve disk assembly 30. The valve disk assembly 30 is coupled to the body 22 to rotate within the interior passage 26 between an open position where the fluid flows and a closed position where the valve disk assembly 30 engages a valve seat or the bore 32 of the valve body 22 to block the flow of fluid.

Referring now to FIGS. 2-6 an embodiment is shown of a valve disk assembly 30. The valve disk assembly 30 includes a disk member 34 having an inlet side 36 and an outlet side 38. In the exemplary embodiment disk member 34 is substantially cylindrical having an outer diameter 39. The outlet side 38 includes a projection 40 having an opening 42. A semi-cylindrical recess 44 is formed in the outlet side 38. The recess 44 extends through the disk member 34 into an opening 46 formed in a projection 48 on the inlet side 36. A pair of projections 50 are formed over the recess 44. The projections 50 have openings 52 that cooperate with the recess 44 to form a cylindrical hole. The openings 42, 46, 52 are arranged coaxially to allow the valve disk assembly 30 to attach to the shaft 28. The shaft 28 and valve disk assembly 30 are coupled together by a pin (not shown). The shaft 28/valve disk assembly 30 rotate in response to actuation of the control device 24. The shaft 28 couples the valve disk assembly 30 to the valve body 22. The outlet side 38 may include one or more ribs 54 to strengthen the disk member 34. As will be discussed in more detail below, the outlet side 38 may have one or more holes 56 that extend through the disk member 34. The holes 56 are sized to receive a fastener.

The inlet side 36 includes a first surface 58 extending about the periphery of the disk member 34 and directly adjacent the outer diameter 39. A second surface 60 is offset from the first surface 58 along a side of the inlet side 36 opposite the opening 46. In the exemplary embodiment, the holes 56 are arranged to extend through the second surface 60. A third surface 62 is offset from the first surface 58 and the second surface 60. The projection 48 extends on a taper from the third surface 62 with one end proximal the second surface 60 being flush with the third surface 62 to a distal end being sized for opening 46. A groove 64 is disposed circumferentially about the disk member 34 between the first surface 58 and the third surface 62. In the exemplary embodiment, the groove 64 has a first end 66 adjacent one corner 68 of the second surface 60 and a second end 70 adjacent an opposite corner 72. The inlet side 36 also includes a semi-circular lip 74 arranged between the first surface 58 and the second surface 60. A planar surface 76 is arranged between the second surface 60 and the third surface 62. A semi-cylindrical surface 78 is arranged between the third surface 62 and the groove 64. The semi-cylindrical surface 78 has an end adjacent the end 66 and an opposite end adjacent the end 70.

The valve disk assembly 30 also includes a seal ring 80. In the exemplary embodiment, the seal ring 80 is semi-circular having a first end 82 and a second end 84 separated by a gap 86. The seal ring 80 may be generally L-shaped having a first portion 88 being generally planar with the first surface 58 and having an outer diameter semi-cylindrical surface 90. The diameter of surface 90 is larger than the diameter 39 to allow the seal ring 80 to engage the bore 32. A second portion 92 extends substantially perpendicular from the first portion 88. The second portion 92 defines an inner diameter surface 94. The second portion 92 has a width and height sized to fit within the groove 64. Also, the diameter of surface 94 is sized to allow the seal ring 80 to freely rotate when installed on the disk member 34. In the exemplary embodiment, the seal ring may be made from a material with desired tribological properties such as but not limited to carbon materials for example.

The seal ring 80 is captured on the disk member 34 by a retainer 96. In the exemplary embodiment, the retainer 96 is semi-cylindrical having a first end 98 and a second end 100. A gap 102 separates the first end 98 from the second end 100. The ends 98, 100 each include a coupling portion 104 with a rim 106. The coupling portion 104 has a curved outer surface 108 and an opposing planar surface 110. The planar surface 110 is disposed adjacent the surface 76 when the retainer 96 is installed.

The coupling portion further includes a first surface 112 disposed between the planar surface 110 and the curved outer surface 108. An opposing second surface 114 is disposed between the planar surface 110 and the rim 106. As will be discussed in more detail herein, the second surface 114 is disposed to contact the second surface 60 and the rim 106 is sized engage and radially constrain the seal-ring second portion 92 but not contact the first portion 88 so as to not interfere with the rotation of the seal-ring 80. The coupling portions 104 each include a hole 116 that is coaxial with the hole 56 and sized receive a fastener.

The rim 106 extends about the retainer 96. The rim 106 includes a surface 118 that is disposed within the groove 64 when the retainer 96 is installed on the disk member 34. It should be appreciated that the rim 106 axially couples the retainer 96 on the disk member 34. As will be discussed in more detail, the rim 106 is adjacent the second portion 92 of the seal ring 80 and radially restrains the seal ring 80 to prevent the seal ring 80 from coming off the disk member 34. Spaced apart from the coupling portions 104, the retainer 96 includes a substantially perpendicular portion 120 to form an L-shaped profile. The portion 120 is disposed adjacent the semi-cylindrical surface 78 when the retainer 96 is installed on the disk member 34.

The retainer 96 further includes one or more tabs or projections 122 that extend radially inward from the portion 120. The projections 122 engage the third surface 62 of the disk member 34. The projections 122 assist in keeping the rim 106 in position and from contacting and rubbing against the seal ring 80. It should be appreciated that by preventing the rim 106 from rubbing against the seal ring 80, the projections 122 may allow the seal ring 80 to freely rotate when the retainer 96 is installed. In the exemplary embodiment, the retainer 96 is made from a suitable material such as stainless steel or Inconel manufactured by Special Metals Corporation for example.

In the exemplary embodiment, the retainer 96 is coupled to the disk member 34 by a pair of fasteners, such as bolt 124 and nut 126 for example. The bolts 124 extend through the holes 56, 116 and are captured by the nuts 126.

To assemble the valve disk assembly 30, the operator bends the seal ring 80 to expand the gap 86 sufficiently enough to slide the surface 94 past the semi-cylindrical surface 78. The seal ring 80 is then released allowing it to be positioned within the groove 64. As discussed above, the seal ring 80 is sized to fit within the groove 64 while remaining free to rotate. In a similar manner the retainer 96 is bent to expand the gap 102 allowing the rim 106 to be slipped into the groove 64 with the coupling portions 104 aligned with the second surface 60 and planar surface 76. The fasteners 124, 126 are then inserted into the holes 56, 116 to couple the retainer 96 to the disk member 34. The valve disk assembly 30 may then be installed within the valve body 22.

Embodiments of the present invention provide advantages in improving the reliability of butterfly valves by providing a freely rotating seal ring that may be secured to the disk member with a single retainer. Embodiment of the present invention provide advantages in retaining the seal ring both axially and radially with a single retainer allowing for a simple and light weight arrangement. Embodiments of the present invention provide advantages in allowing the selection of materials with desired tribological properties.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A butterfly valve disk assembly comprising:
   a disk member having a first surface disposed about a periphery having a first diameter, the disk member having a second surface offset from the first surface, the disk member having an inlet side and an outlet side, the second surface being on the inlet side;
   a seal ring arranged adjacent the first surface, the seal ring having a first outer surface with a second diameter, wherein the second diameter is larger than the first diameter; and,
   a retainer coupled to the second surface adjacent the seal ring opposite the first surface, the retainer having an inner surface, wherein the inner surface is arranged to radially constrain the seal ring on the disk member;
   wherein the disk member includes a groove disposed adjacent the first surface and at least a portion of the seal ring is disposed within the groove;
   wherein the retainer is at least partially disposed within the groove;
   wherein the disk member includes a third surface offset from the second surface distal from the first surface; and
   wherein the retainer includes a first projection distal from the second surface, the first projection engaging the third surface.

2. The butterfly valve disk assembly of claim 1 further comprising a radial gap between the retainer and the seal ring, wherein the seal ring is free to rotate on the disk member.

3. A butterfly valve comprising
   a valve body having a bore;
   a valve disk assembly rotationally coupled to the valve body, the valve disk assembly rotatable between a closed position in contact with the bore and an open position, the valve disk assembly having a disk member with an inlet side and an outlet side, the inlet side having a first surface disposed about a periphery and a second surface offset from the first surface, wherein the second surface is opposite the outlet side;
   a semi-circular seal ring arranged adjacent the first surface; and,
   a retainer coupled to the second surface, the retainer arranged to retain the seal ring in a radial and axial direction; and
   wherein the disk member includes:
   a third surface adjacent the second surface opposite the first surface; and,
   a semi-circumferential groove disposed about an inner diameter of the first surface, the semi-circumferential groove having a first end adjacent a side of the second surface and a second end adjacent an opposite side of the second surface.

4. The butterfly valve of claim 3 wherein the seal ring includes a first portion substantially parallel to the first surface and a substantially perpendicular second portion disposed along an inner diameter of the seal ring, wherein the second portion is at least partially disposed in the semi-circumferential groove.

5. The butterfly valve of claim 4 wherein the retainer includes a third portion coupled to the second surface and a semi-circular fourth portion extending from the third portion, the semi-circular fourth portion being at least partially disposed within the semi-circumferential groove.

6. The butterfly valve of claim 5 wherein the disk member includes a first hole extending between the inlet side and the outlet side at the second surface and the third portion includes a second hole arranged coaxial with the first hole.

7. The butterfly valve of claim 6 further comprising a fastener disposed within the first hole and the second hole.

8. The butterfly valve of claim 5 wherein the retainer includes a fifth portion distal from the second portion and engaging the third surface.

9. A butterfly valve comprising:
   a valve body;
   a valve disk assembly rotationally coupled to the valve body, the valve disk assembly comprising a disk member having a side with a first surface, a second surface offset from the first surface and a third surface offset from the second surface and distal from the first surface, the disk member having a groove disposed between the first surface and the third surface;
   a seal ring arranged adjacent the third surface and at least partially within the groove, the seal ring having an outer diameter larger than a disk outer diameter; and,
   a retainer having an L-shaped portion adjacent the seal ring, the retainer having a first portion and a second portion spaced apart by a gap, the first portion being disposed adjacent a first end of the L-shaped portion and the second portion adjacent a second end of the L-shaped portion, the first portion and the second portion being coupled to the second surface.

10. The butterfly valve of claim 9 wherein the retainer includes a fourth surface extending about an inner diameter, the fourth surface radially constraining the seal ring.

11. The butterfly valve of claim 10 wherein the L-shaped portion is at least partially disposed within the groove.

12. The butterfly valve of claim 11 wherein the disk member further includes a planar fifth surface between the first surface and the second surface.

13. The butterfly valve of claim 12 wherein the first portion includes a planar surface adjacent the planar fifth surface and the second portion includes a planar surface adjacent the planar fifth surface.

14. The butterfly valve of claim 10 further comprising a first projection extending from the L-shaped portion and disposed between the first portion and the second portion, the first projection engaging the first surface.

15. The butterfly valve of claim 14 further comprising a second projection extending from the L-shaped portion and disposed between the first projection and the second portion, the second projection engaging the first surface.

* * * * *